United States Patent [19]

Moriue et al.

[11] Patent Number: 5,311,510
[45] Date of Patent: May 10, 1994

[54] DATA STORING SYSTEM FOR A COMMUNICATION CONTROL CIRCUIT

[75] Inventors: Hiroo Moriue; Yutaka Matsuda; Kiyoshi Inoue, all of Hiratsuka; Yoshikazu Nobutoki, Higashihiroshima; Seiji Hirano, Hiroshima; Hiroaki Sakamoto, Fukuyama, all of Japan

[73] Assignees: The Furukawa Electric Co., Ltd., Tokyo; Mazda Motor Corp., Hiroshima, both of Japan

[21] Appl. No.: 919,911

[22] Filed: Jul. 27, 1992

[30] Foreign Application Priority Data

Jul. 30, 1991 [JP] Japan ................ 3-189762
Jul. 30, 1991 [JP] Japan ................ 3-189763
Jun. 1, 1992 [JP] Japan ................ 4-140215

[51] Int. Cl.$^5$ ............................. H04L 12/56
[52] U.S. Cl. ............................. 370/61; 370/94.1; 370/119
[58] Field of Search ............ 370/60, 60.1, 85.1, 370/85.2, 85.3, 85.4, 85.5, 94.1, 94.2, 119, 61; 340/825.05, 825.06, 825.07, 825.5, 825.51; 375/7, 8

[56] References Cited

U.S. PATENT DOCUMENTS

| 5,043,981 | 8/1991 | Firoozmand et al. | 370/85.4 |
| 5,111,452 | 5/1992 | Kyuma | 340/825.5 |
| 5,144,621 | 9/1992 | Kinashi et al. | 370/85.1 |

FOREIGN PATENT DOCUMENTS 0272834 6/1988 European Pat. Off. .
0274689 7/1988 European Pat. Off. .
0356113 2/1990 European Pat. Off. .

Primary Examiner—Wellington Chin
Attorney, Agent, or Firm—Frishauf, Holtz, Goodman & Woodward

[57] ABSTRACT

The data storing system according to the present invention is used for a communication control circuit. The communication control circuit is equipped with a communication sequencer, which takes in a message to be transmitted to a multiplex bus, an ID table which registers data IDs of messages necessary for the station, and the first and second memory circuits which have memory areas keyed to the data IDs. When the communication sequencer takes in a message, it determines whether its data ID exists in the ID table. If the data ID exists and the frequency of occurrence is high, then data following the data ID is temporarily stored in a memory area keyed to a data ID of the first memory circuit. If the data ID exists and the frequency of occurrence is low, then the data following the data ID is temporarily stored in a memory area of the second memory circuit. When a CPU reads the aforementioned stored data, it sets the status area of the storage area, in which the data was stored, for a state that enables a data storage change.

18 Claims, 3 Drawing Sheets

DATA STORING SYSTEM FOR A COMMUNICATION CONTROL CIRCUIT

BACKGROUND OF THE INVENTION

1. Field of the Invention

The present invention relates to a communication control circuit connected to a multiplex transmission line to transmit messages, and more particularly, to a data storing system for the communication control circuit for storing data transmitted and received.

2. Description of the Related Art

This type of communication control circuit is provided at a multiplex node for performing multiplex transmission of data. The multiplex node is comprised of a communication control circuit (LSI) connected to a multiplex transmission line (multiplex bus) consisting of paired wires, etc., a control circuit (CPU) for controlling load devices, and I/O interface (I/F) circuits located between the individual load devices and the CPU.

The LSI has a receiving buffer circuit for storing message data and an identifier (data ID) for identifying the data. When the LSI receives a message from the multiplex bus, it stores the data and the data ID of the message in the receiving buffer circuit, and sends out an interrupt signal to the CPU to request that it read the data in the receiving buffer circuit.

In response to the above-mentioned interrupt, the CPU interrupts its controlling a load device (e.g., a switch or motor) through the I/F circuit, and reads the data ID in the receiving buffer circuit to determine whether the following data is necessary for its station, then carries out an interrupt processing for taking in the above-mentioned data.

However, in the above-mentioned conventional example, each time a message is received, the CPU is interrupted to store the data in a prescribed memory in the CPU, causing high load on the aforementioned CPU when it stores the data.

To solve the aforementioned problem, in another conventional example, a storage circuit such as a RAM, which permits read and write of data, is provided in place of the aforementioned receiving buffer circuit. In this conventional example, the aforementioned storage circuit comprises an ID storage area for registering data IDs, which are allocated in advance to data necessary for the station, a data storage area for storing message data which correspond to the above-mentioned registered data IDs, and a storage area for a read status which indicates whether the CPU has read the data for each of the above-mentioned registered data IDs. The LSI determines whether the data ID of a message received from the multiplex bus is identical to the above-mentioned registered data ID. If the above-mentioned data IDs are found identical, then the data of the above-mentioned received message is stored in a data storage area which corresponds to the data ID. Then, the LSI determines whether the CPU has read the data for each of the aforementioned registered data IDs by the read status. There were some cases where data that has the identical ID to that of the aforementioned data could not be written unless the aforementioned CPU reads the data. In this example, a data storage area is provided for each data ID, and therefore, the LSI is allowed to store only necessary received data in the same manner as it would access a RAM, thus achieving reduced load on the CPU.

In the aforementioned communication control circuit, data storage areas are provided so that they are keyed to the IDs necessary for the station; therefore, the memory capacity is liable to become enormous.

SUMMARY OF THE INVENTION

The present invention is intended to improve the point described above, and an object of the invention is to provide a data storing system for a communication control circuit which allows only necessary data to be stored and a memory capacity to be reduced.

Another object of the present invention is to provide a data storing system for a communication control circuit which makes it possible to store the subsequent data as necessary and improve responsiveness by reducing the occupying time of a multiplex bus and also to enable the CPU to read received data at its own timing.

The above-mentioned objects are achieved by the data storing system for a communication control circuit in accordance with the present invention, the data storing system for a communication circuit circuit comprising;

a registering means which registers the data identifier of the necessary message out of the messages transmitted to the multiplex transmission line;

a storage means which has the first storage area for storing the data, that corresponds to a particular data identifier, among the foregoing necessary messages, while keying it to the data identifier, and the second storage area for sequentially storing the data, that correspond to a plurality of data identifiers other than the foregoing particular data identifier; and a communication control means which determines whether the data identifier of a message taken in exists in the foregoing registering means, and stores the data, which corresponds to the data identifier, in the foregoing first or second storage area if it finds the data identifier in the registering means.

According to the data storing system for a communication control circuit described above, it is possible, for example, to store the data, which correspond to the data identifiers with a high frequency of occurrence, in the first storage area, and store the data, which correspond to the data identifiers with a low frequency of occurrence, in the second storage area; therefore, after reading the aforementioned data, the CPU places the storage area of the data in a state that enables a storage change. This makes it possible to store, in sequence, those data corresponding to data identifiers of a low frequency of occurrence, in the second storage area of a smaller memory capacity, thus achieving a reduced memory capacity of the entire storage means.

The aforementioned objects, characteristics, and advantages of the present invention will now be further clarified by the following detailed description based on the accompanying drawings.

DESCRIPTION OF THE PREFERRED EMBODIMENTS

Figure 1:
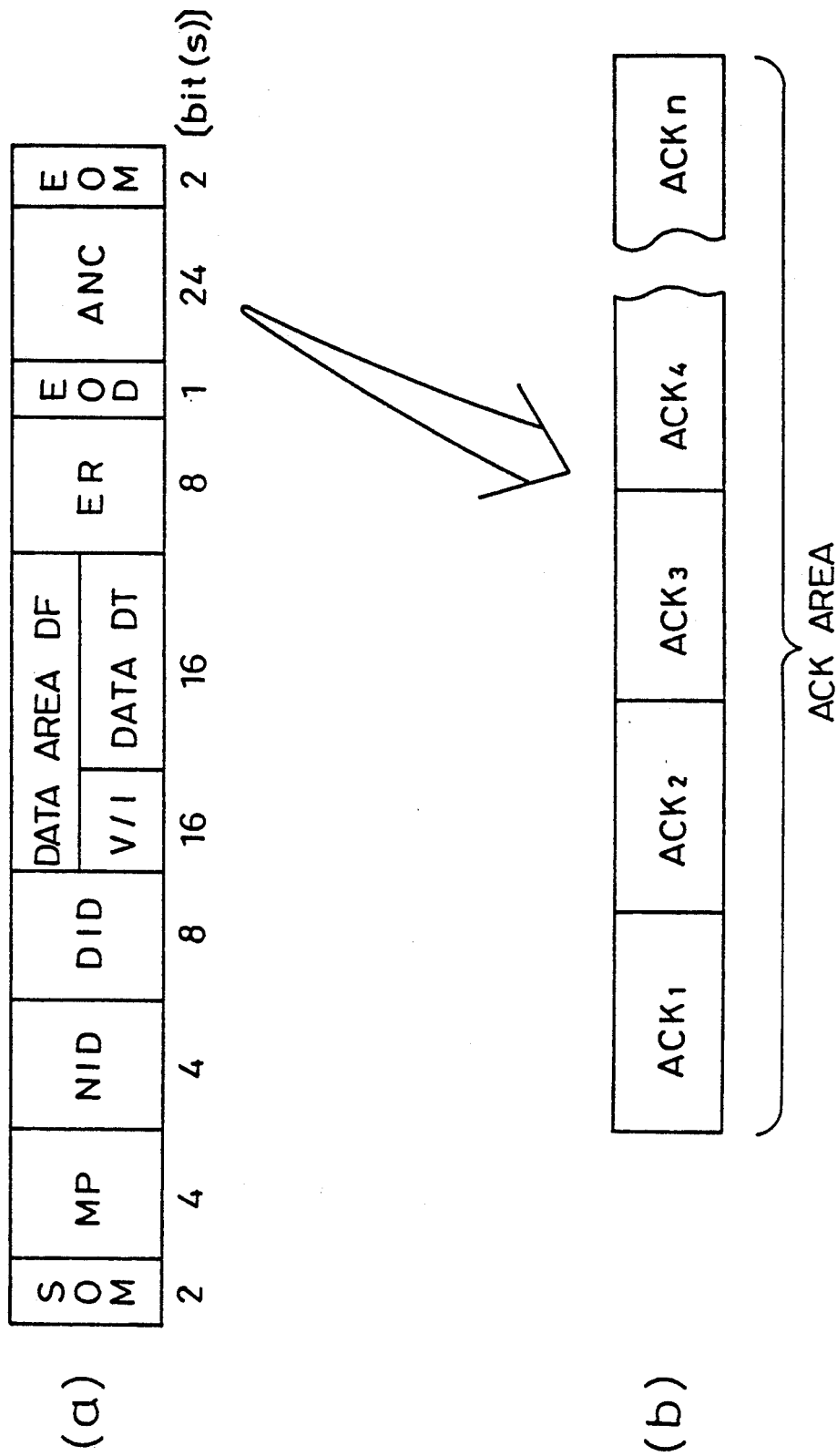
FIG. 1(a) and 1(b) are diagrams of the configuration of the frame of a signal transmitted among multiplex nodes according to the present invention.

Referring to FIG. 1, the frame of a signal transmitted among the multiplex nodes in accordance with the present invention is configured as shown in (a). The above-mentioned frame comprises a 2-bit message start code SOM which indicates the start of a message, a 4-bit priority MP which indicates the priority level of a message, a 4-bit identifying code NID (Network ID) which indicates a transmitting network, an 8-bit identifying code DID (Data ID) which indicates the contents (function) of data, a 32-bit data area DF which indicates the area of data, an 8-bit error cheek code ER for error checking, a 1-bit data end area EOD which indicates the end of data, a 24-bit control acknowledgment [ANC (Acknowledgment for Network Control)] area, and a 2-bit message end code EOM which indicates the end of a message. The ANC area serves as a receiving response signal area for all nodes connected to a network; this area is divided into a plurality of time slots (1 bit for each slot) as shown in (b), and each of the aforementioned time slots is allocated to each of the multiplex nodes of the network. More specifically, in this frame, the time slots of the multiplex nodes constantly connected to the multiplex bus are allocated specifically to the aforementioned ANC area, and the time slots of the multiplex nodes such as optional multiplex nodes, which are newly connected to the multiplex bus, are allocated specifically to the aforementioned ANC area.

Thus, when each multiplex node receives a message normally, it sends a 1-bit ACK signal to the multiplex bus in a position of the time slot assigned to the station in the ANC area in the message. This enables the transmitting multiplex node to know whether the message it sent out has been received normally and which node has received it; in other words, it enables the transmitting multiplex node to know whether there is any multiplex node that failed to receive a message normally.

Figure 2:
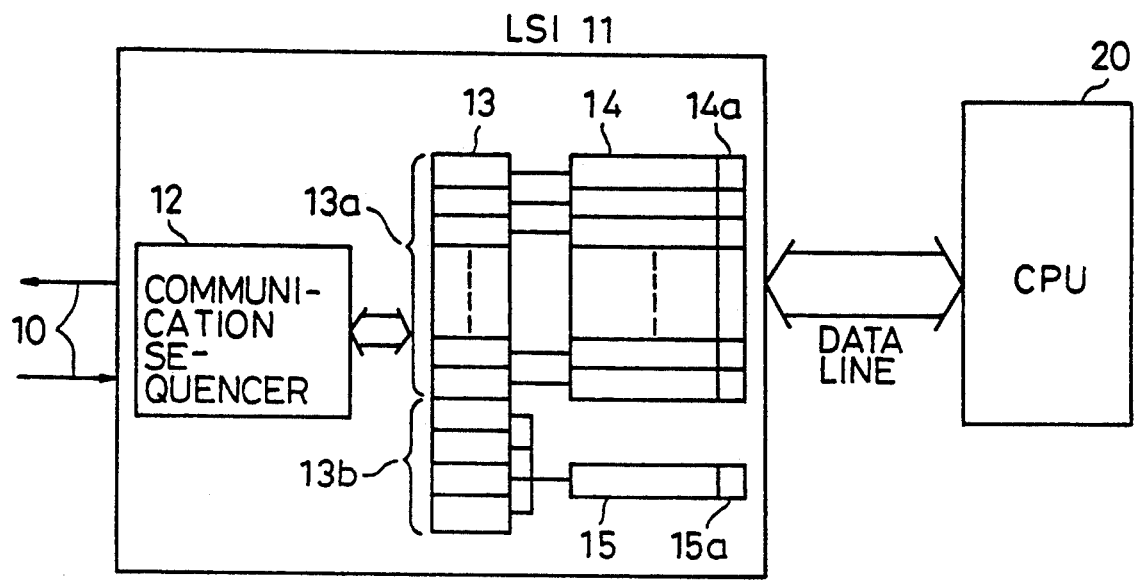
FIG. 2 is a configuration diagram of the first embodiment of a communication control circuit used to explain the data storing system according to the present invention.

FIG. 2 is a diagram which illustrates the first embodiment of the LSI which employs the data storing system in accordance with the present invention.

Referring to FIG. 2, an LSI 11 is equipped with a communication sequencer 12, an ID table 13, a memory circuit 14 comprising a DPRAM, etc., and a memory circuit 15 comprising an FIFO (first-in first-out) memory. As in a conventional example, a CPU 20 provides a control circuit which controls load devices.

The communication sequencer 12 is a communication control means which is connected to a multiplex bus 10 and which decides whether the data ID of a message received from the multiplex bus 10 through, for instance, a driver/receiver, not shown, is identical to a registered data ID, then stores the data of the received message in the memory circuit 14 or 15 according to the result of the decision. In other words, if the communication sequencer 12 finds that the received data ID is identical to a registered data ID and is also a data ID registered in the ID table 13a, then it stores the data, which follows the aforementioned received data ID, in the memory circuit 14 so that the data is keyed to the data ID. Likewise, if the communication sequencer 12 finds that the received data ID is identical to a registered data ID and is also a data ID registered in the ID table 13b, then it stores the data, which follows the aforementioned received data ID, in the memory circuit 15 so that the data is keyed to the data ID. Further, after storing the data in the memory circuit 14 or 15, the communication sequencer 12 sends out an interrupt signal to the CPU 20 to request that it read the aforementioned data.

The ID table 13 provides registered data IDs that are allocated to data necessary for the station.

The memory circuits 14 and 15 store, under the control of the communication sequencer 12, the data following the data ID of message received from the multiplex bus 10 in such a manner that the data are keyed to the data ID. In addition, the above-mentioned memory circuits 14 and 15 are equipped with read status areas 14a and 15a which indicate, for each registered data ID mentioned above, whether the CPU 20 has read the data. The read status areas 14a and 15a are designed so that the presence of status is switched when the CPU 20 reads data or the LSI 11 stores data.

Additionally, in the present embodiment, the CPU 20 registers the data IDs of the messages which are necessary for the station, in the ID table 13. At this time, for example, the data IDs of messages, that occur frequently, are registered in the ID table 13a, while the data IDs of messages, that occur less frequently, are registered in the ID table 13b.

The operation of the LSI 11 shown in FIG. 2 will now be described.

First, when the communication sequencer 12 of the LSI 11 according to the present embodiment receives a message, it compares the data ID of the message with the data IDs registered in the ID table 13 to determine whether the message data ID coincide with one in the table.

If no coinciding data ID is found, the data corresponding to the aforementioned data ID is not stored. If a coinciding data ID is found, it is determined whether there is the read status in the area 14a or 15a, whichever is appropriate.

If the read status is found, then it is determined that the CPU 20 has completed reading the data, enabling a data storage change, and the data just received is stored in the memory circuit 14 or 15, whichever is appropriate. In other words, if the data ID of the received message is a data ID registered in the ID table 13a, then the communication sequencer 12 stores the data in a storage area of the memory circuit 14 that corresponds to the aforementioned data ID, and causes the status of the area 14a, which is keyed to the storage area, to switch to absence. Additionally, if the data ID of the received message is a data ID registered in the ID table 13b, then the communication sequencer 12 stores the data in the memory circuit 15 with a smaller memory capacity and causes the status of the area 15a of the memory circuit 15 to switch to absence. In either case, the communication sequencer 12 sends the data, which indicates verified receipt of the message, to the node, which sent out the message, via the multiplex bus 10.

If no read status is found, then the communication sequencer 12 determines that the CPU 20 has not read the data; therefore it does not write the data, which has just been received, in the memory circuit 14 or 15; further, it does not send out the data which indicates verified receipt of the message.

When the system for storing received data described above is applied to the multiplex transmission in a car, for example, the data, which correspond to the data IDs with a higher frequency of occurrence, include cyclic signals issued in a predetermined cycle, e.g., the sensor signals such as car speed data and water temperature sensor, while the data, which correspond to the data IDs with a lower frequency of occurrence, include such signals as event-driven type switch signals.

As explained above, in the data storing system according to the present invention, for example, according to the frequency of occurrence of received data IDs, the storage areas for corresponding data differ. This makes it possible to efficiently store the aforementioned data in the memory circuits 14 and 15, thus achieving a reduced memory capacity of the whole memory circuit. More specifically, messages, which frequently occur, are stored in the memory circuit 14, however, if other message necessary for the station is received in succession, the message is stored in other area of the memory circuit 14 or 15. Thus, the data storing system according to the present invention allows the data of above-mentioned other message to be stored in a buffer with no problem.

Additionally, in the multiplex transmission system in the aforementioned car, it seldom happens that messages of the same data ID are received in succession, and it also rarely happens that different messages of a low frequency of occurrence are received in succession. Therefore, in this embodiment, the probability of the occurrence of buffer overrun can be minimized.

A request for read, which is sent from the LSI 11 to the CPU 20, is issued only when data necessary for the station is stored. This results in reduced load on the CPU 20, and the CPU 20 reads out the latest data stored in the aforementioned memory circuit 14 or 15 when an interrupt signal is received so that it can control a load device such as an actuator.

The present invention is not limited to the data storing system in the embodiment described above but it can also be applied to storage of data to be transmitted. In this case, the CPU 20 writes data to be transmitted in the memory circuit 14 or 15 of the LSI 11, keying the data to be transmitted to a corresponding data ID. The areas 14a and 15a function as the areas which indicate a request for transmitting data stored in the aforementioned memory circuit 14 or 15, or the end of transmission of such data.

More specifically, the CPU 20 reads the contents of the area 14a or 15a of the LSI 11 when data to be transmitted occurs, and it writes the data to be transmitted in the memory circuit 14 or 15, which corresponds to the data ID, if the state is the end of transmission, then places the corresponding area 14a or 15a in the state of request for transmission. The communication sequencer 12 starts transmission of corresponding data when the area 14a or 15a is placed in the state of request for transmission, and sets the area 14a or 15a in the state of end of transmission when the transmission is completed. At this time, if the CPU 20 is set so that it stores data, which are transmitted frequently, in the memory circuit 14, then the transmission of the data is started simply by setting the corresponding area 14a for the state of request for transmission (without writing the data to be transmitted again) when transmission is necessary, thus reducing the load on the CPU 20. Trying to store all data to be transmitted in the memory circuit 14 by means of the CPU 20 would lead to a huge memory capacity. To avoid it, data with a low frequency of transmission are written in the memory circuit 15 when they are transmitted. This makes it possible to reduce the memory capacity without adding to the load on the CPU 20.

There are cases where data generated later has a higher priority level than that of data written in the memory circuit 15. To handle such cases, in this embodiment, the CPU 20 is designed so that, during a state where the transmission of data to be transmitted (e.g., data to be transmitted A) written in the memory circuit 15 has not been terminated, for example, during a state where the multiplex bus 10 is busy and the system is waiting to transmit, if other data to be transmitted (e.g., data to be transmitted B) occurs, it compares the priority level of the data to be transmitted A and the data to be transmitted B. if the data to be transmitted B occurring later has a higher level of priority, then the CPU 20 forcibly places the corresponding area 15a in the state of the end of transmission to interrupt the request for the transmission of the data to be transmitted A, writes the data to be transmitted B in the memory circuit 15, and sets the area 15a for a state of request for transmission.

Likewise, there are also cases where the priority level of data occurring later is higher than that of data set in the memory circuit 14. In such cases, during a state where the transmission of the data to be transmitted A written in the memory circuit 14 has not been terminated, for example, during a state where the multiplex bus 10 is busy and the system is waiting to transmit, if other data to be transmitted B occurs, then the CPU 20 compares the priority level of the data to be transmitted A and the data to be transmitted B. If the data to be transmitted B occurring later has a higher level of priority, then the CPU 20 forcibly places the corresponding area 14a in the state of the end of transmission to interrupt the request for the transmission of the data to be transmitted A, writes the data to be transmitted B in the memory circuit 15, and set the area 15a for a state of request for transmission.

As explained above, according to the data storing system of the present invention, data stored in a memory circuit can be replaced by data with a higher priority level, making it possible to reduce the memory capacity and transmit data with a higher priority level first.

This invention is not limited to the data storing system of the communication control circuit described in the embodiments described above.

Figure 3:
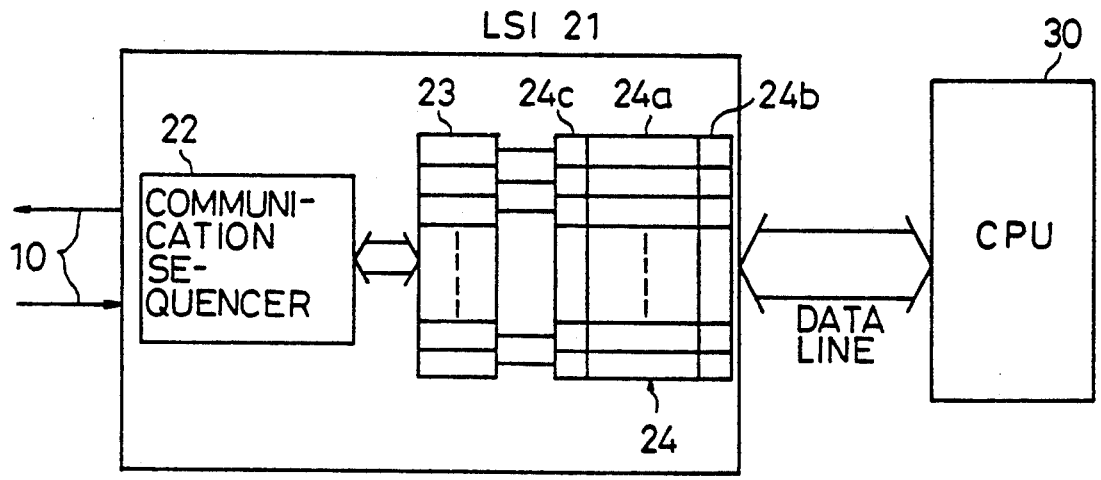
FIG. 3 is a configuration diagram of the second embodiment of the communication control circuit used to explain the data storing system according to the present invention.

Referring to FIG. 3, an LSI 21 is equipped with a communication sequencer 22, an ID table 23, and a memory circuit 24. A CPU 30 is a control circuit for controlling load devices as in the case of the first embodiment.

As in the first embodiment, the ID table 23 provides registered data IDs that have been allocated to data necessary for the station.

The memory circuit 24 stores data, which follow data IDs of messages received from the multiplex bus 10, in a data storage area 24a, keying the data to the data IDs under the control of the communication sequencer 22. The aforementioned memory circuit 24 is equipped, in addition to the data storage area 24a, with a read status area 24b, which indicates whether the CPU 30 has read data for each of the above-mentioned registered data TDs, and a flag storage area 24c, which stores a flag indicating whether overwrite of each of the above-mentioned data is permitted. The read status area 24b is designed so that the presence of status is changed whenever the CPU 30 reads data or the LSI 21 stores data. The flag storage area 24c can be changed by the CPU 30.

The communication sequencer 22 is a communication control means which is connected to the multiplex bus 10 and which determines whether the data ID of a message received from the multiplex bus 10 via, for example, a driver/receiver not shown is identical to a registered data ID, then stores the data of the received message in the memory circuit 24 according to the result of the determination. More specifically, the communication sequencer 22 performs overwrite of the data following the received data ID in the data storage area 24a regardless of the presence of the read status of the area 24b if the received data ID is identical to a registered data ID and also the flag is set in the storage area 24c that corresponds to the data ID. Further, after storing the data in the memory circuit 24, the communication sequencer 22 sends the interrupt signal to the CPU 30 to request that it read the data.

The operation of the LSI 21 shown in FIG. 3 will now be described.

When the communication sequencer 22 of the LSI 21 according to this embodiment receives a message, it compares the data ID of the message with a data ID registered in the ID table 23 to determine whether the data IDs coincide with each other.

If no coinciding data ID is found, then no storage of the data, which corresponds to the above-mentioned data ID, is carried out. If a coinciding data ID is found, then it is determined whether the flag of the corresponding storage area 24c has been set.

If the flag has been set, then the communication sequencer 22 decides that data overwrite is enabled and writes the data, which has been just received, over the data already stored in the data storage area 24a which corresponds to the data ID. The communication sequencer 22 further sends the data, which indicates verified receipt of the message, to the transmitting node of the aforementioned message via the multiplex bus 10. If the flag has not been set, then the communication sequencer 22 cheeks for the presence of the read status of an area 24b which corresponds to the data ID.

If the communication sequencer 22 identifies the presence of the read status, then it determines that the CPU 30 has finished reading the data and therefore overwrite of the data is enabled, and performs overwrite of the data, which has been just received, in the data storage area 24a which corresponds to the data ID. The communication sequencer 22 then sends the data, which indicates verified receipt of the message, to the transmitting node of the aforementioned message via the multiplex bus MB. if the communication sequencer identifies no presence of the read status, then it determines that the CPU 30 has not read the data and therefore it does not write the data, which has been just received, in the data storage area 22a and it does not send the data which indicates verified receipt of the message.

When the aforementioned received data storing system is applied to the multiplex transmission in a car, the data enabling overwrite are preferably cyclic signals issued in a predetermined cycle, e.g., sensor signals including car speed data and water temperature sensor.

The data, which prohibit overwrite, are preferably, for instance, event-driven type switch signals with a low frequency of occurrence.

As explained above, according to the data storing system of the present invention, even if the CPU 30 does not read data stored in the memory circuit 24, the communication sequencer 22 decides whether overwrite of the data should be performed according to the necessity or other character of the received data, enabling the subsequent data to be stored and therefore achieving a reduced time required for receiving data. Further, the CPU 30 can read the latest data stored in the aforementioned memory circuit 24 as necessary at its optional timing without the need of interrupting the control over an actuator or other load device. Furthermore, in this embodiment, smoother storage of received data into the memory circuit 24 is ensured, resulting in reduced chances of a node failing to receive data. Consequently, the chances of re-transmission of messages by a transmitting node can be reduced, thereby decreasing the chances of a transmitting node identifying a node breakdown.

In this embodiment, the memory circuit is provided with the area 24b for the read status and a storage area 24c for storing the flag, and the data enabling overwrite and the data disabling overwrite are set. However, the data storing system in accordance with the present invention is not limited to that. For instance, it is possible to store all data necessary for the station in the memory circuit as the data enabling overwrite rather than providing the area 24b for the read status and the storage area 24c for storing the flag. It is also possible to provide the LSI with a memory circuit consisting of a FIFO memory for data with a low frequency of occurrence as shown in the first embodiment so that the data with a low frequency of occurrence are stored in that memory circuit. In this embodiment, the data storing system for received data has been described, but the system is not limited only to this; instead, it is also applicable to data storage of data to be transmitted as is the case with the first embodiment.

The present invention is not limited to the data storing system for the communication control circuit according to the embodiments described above.

Figure 4:
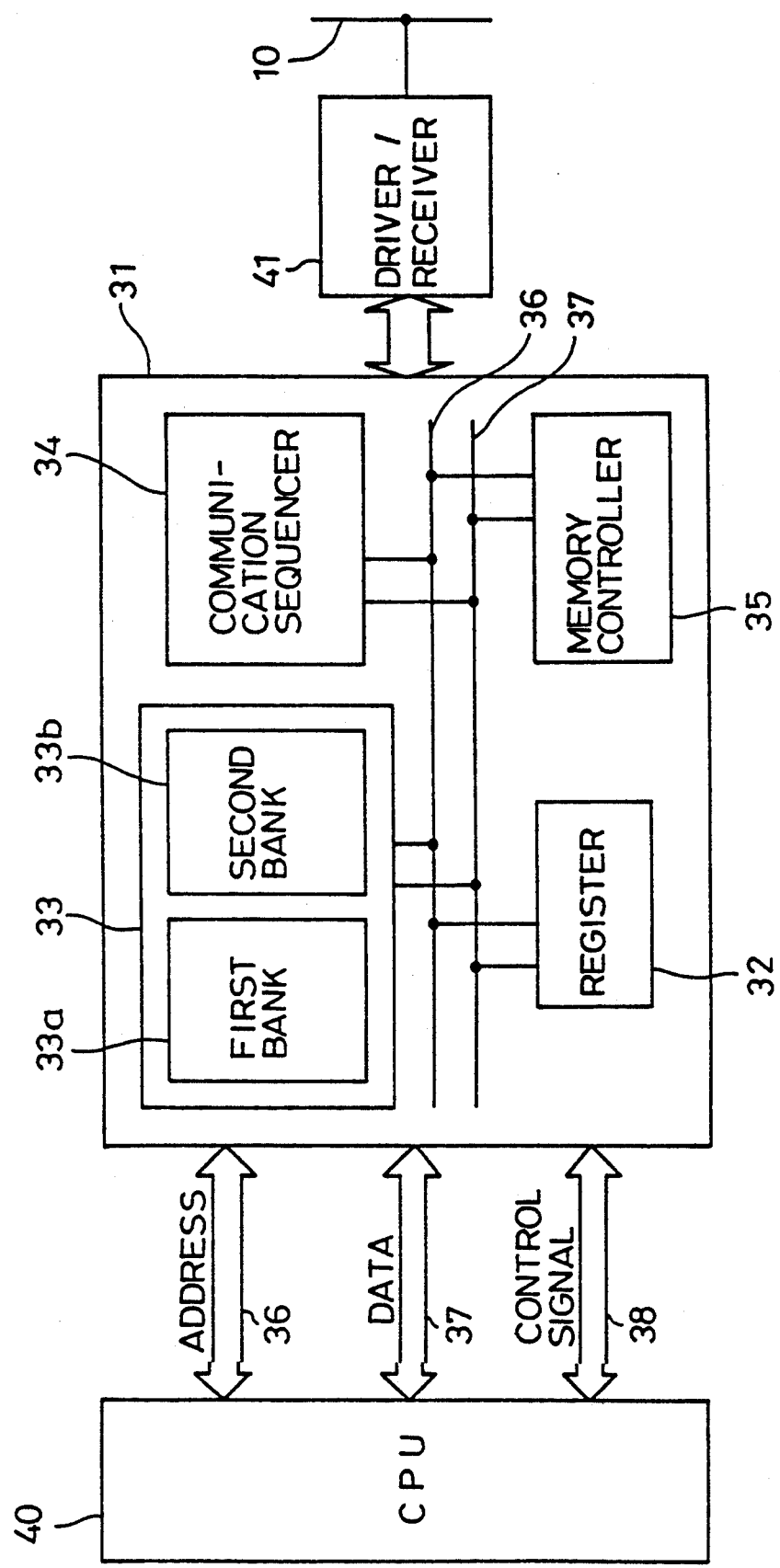
FIG. 4 is a configuration diagram of the third embodiment of the communication control circuit used to explain the data storing system according to the present invention.

Referring to FIG. 4, an LSI 31 is equipped with a register 32, a receiving buffer circuit 33, a communication sequencer 34, a memory controller 35, and an address bus 36 and a data bus 37 for connecting these circuits. A CPU 40 is connected to the aforementioned LSI 31 via the address bus 36, the data bus 37, and the control line 38, and it performs input and output of addresses, data and control signals between itself and the LSI 31.

Just like the ID tables 13 and 23 of the first and second embodiments, respectively, the register 32 is an ID table for registering data IDs allocated to data necessary for the station.

The receiving buffer circuit 33 has two storage areas, the first bank 33a and the second bank 33b. The first bank 33a and the second bank 33b are placed under switch-control of the memory controller 35 and they store received data under the control of the communication sequencer 34.

The communication sequencer 34 is a communication control means which is connected to the multiplex bus 10 via a driver/receiver 41 and which determines if the data ID of a message received from the multiplex bus 10 via the driver/receiver 41 is identical to a registered data ID, then stores the data of the received message in the first bank 33a or the second bank 33b of the receiving buffer circuit 33 according to the result of the determination. More specifically, the communication sequencer 34 stores the data following the aforementioned received data ID in the receiving buffer circuit 33, keying the data to the data ID, if the received data ID is identical to a registered data ID. After storing the data in the aforementioned first bank 33a or the second bank 33b, the communication sequencer 34 sends the interrupt signal to the CPU 40 via the control line 38 to request that it read the data.

The memory controller 35 is a switch-controlling means which monitors access by the CPU 40 to the first bank 33a and the second bank 33b and performs switch-control over the first bank 33a and the second bank 33b according to the condition of the above-mentioned access.

The operation of the LSI 31 shown in FIG. 4 will now be described.

First, the memory controller 35 of the LSI 31 according to the present embodiment controls switching between the banks so that the CPU 40 can access the first bank 33a. The memory controller 35 then monitors access by the aforementioned CPU 22 to the first bank 33a, and once the CPU 40 accesses the first bank 33a, it disables the communication sequencer 34 to write the received data in the first bank 33a.

Accordingly, if a message is received from the multiplex bus 10 while the CPU 40 is reading data stored in the first bank 33a, then the communication sequencer 34 determines whether the data ID of the received message is identical to a data ID registered in the register 32.

If no coincident data ID is found, then the storage of the data corresponding to the above-mentioned data ID is not carried out. If a coincident data ID is found, then the data following the above-mentioned received data ID is stored in the second bank 33b, and the flag provided in the sequencer, the second bank 33b full flag, is set. The full flag indicates that received data has been stored in the second bank 33b. If received data has been stored in the first bank 33a, then the communication sequencer 34 sets the first bank 33a full flag.

When the CPU 40 reads, for example, the data stored in the last address of the first bank 33a, the memory controller 35 determines that the access by the CPU 40 to the fist band 33a has been terminated and performs switch-control between the first bank 33a and the second bank 33b to enable the CPU 40 to access the second bank 33b.

If a plurality of messages are received from the multiplex bus 10 while the CPU 40 is accessing the first bank 33a, then the communication sequencer 34 determines whether the data ID of the received messages is identical to a data ID registered in the register 32 and if it is identical, the sequencer writes the data following the received data ID over the data in the second bank 33b. Upon completion of the access by the CPU 40 to the first bank 33a, the memory controller 35 switches to the second bank 33b to enable the CPU 40 to read the latest data stored in the second bank 33b.

When the data storing system described above is applied to the multiplex transmission in a car, the received data should preferably be cyclic signals that are issued in a predetermined cycle, e.g., the sensor signals such as car speed data and water temperature sensor.

As explained above, according to the data storing system of the present invention, except for the case wherein the necessity of received data is determined by its data ID and the received data is stored in a storage area and also the other storage area has not been accessed, the subsequent data can be stored in the other storage area even if the CPU does not read data stored in the receiving buffer circuit. Thus, the time required for the CPU to receive data can be shortened, permitting better responsiveness. Furthermore, the CPU is allowed to read the latest data stored in the above-mentioned receiving buffer circuit as necessary at any timing without the need of interrupting the control over an actuator or other load device. In addition, smoother storage of received data is attained and the chances of a node failing to receive data can be reduced, resulting in reduced chances of re-transmission of messages by a transmitting node, thereby decreasing the chances of a transmitting node identifying a node breakdown.

In this embodiment, it is also possible to provide the LSI with a memory circuit consisting of a FIFO memory so that the data with a low frequency of occurrence are stored in that memory circuit as shown in the first embodiment. In this embodiment, the data storing system for received data has been described, but the system is not limited only to this; instead, it is also applicable to data storage of data to be transmitted as is the case with the first embodiment.

We claim:

1. A data storing system for a communication control circuit which is connected to a multiplex transmission line and which, when a message transmitted through said multiplex transmission line is taken in, stores the data contained in said message, the communication control circuit comprising;
   registering means for registering a data identifier of a necessary message among messages transmitted through said multiplex transmission line;
   storing means which includes a first storage area for storing data, which corresponds to a particular data identifier among said necessary messages, keying the data to said data identifier, and a second storage area for sequentially storing data which corresponds to a plurality of data identifiers other than said particular data identifier; and
   communication control means for determining, when a message is taken in, whether its data identifier exists in said registering means and, if it is determined that the identifier is present, for causing the data corresponding to said data identifier to be stored in one of said first and second storage areas of said storing means.

2. The data storing system for a communication control circuit according to claim 1, wherein, when the data stored in said first or second storage area is read, said communication control means permits data storage to change in the storage area in which said data has been stored.

3. The data storing system for a communication control circuit according to claim 2, wherein said storing means stores data received from said multiplex transmission line.

4. The data storing system for a communication control circuit according to claim 2, wherein said data to be read is temporarily stored in said first or second storage area.

5. The data storing system for a communication control circuit according to claim 1, wherein said storing means stores data received from said multiplex transmission line.

6. The data storing system for a communication control circuit according to claim 1, wherein said storing means stores data received from the multiplex transmission line, and, when data stored in said second storage area is read, said communication control means sets the second storage area, where said data has been stored, for a state which enables a data storage change and also sets the first storage area for a state which enables a data storage change whether the data stored in the second storage area has been read or not.

7. The data storage system for a communication control circuit according to claim 6, wherein the data received in said second storage area from the multiplex transmission line, is temporarily stored in said second storage area.

8. The data storing system for a communication control circuit according to claim 1, wherein said storing means stores means stores data received from the multiplex transmission line, and, when data stored in said second storage area is read, said communication control means sets the second storage area, where said data has been stored, for a state which enables a data storage change and, for the first storage area, said communication control means determining whether a storage change of the corresponding data should be made on each data identifier of a received message and then setting the first storage area for a state which enables a storage change of the data stored in said first storage area, according to the result of said determination.

9. The data storing system for a communication control circuit according to claim 8, wherein the data received in said second storage area from the multiplex transmission line, is temporarily stored in said second storage area.

10. The data storing system for a communication control circuit according to claim 1, wherein:
said storing means stores data received from the multiplex transmission lines;
at least the first storage area of said storing means includes at least first and second storing places for storing said received data; and
said communication control circuit includes a switch-controlling means for switch-controlling the at least first and second storing places for storing said data, said switch-controlling means switching and at least first and second storing places only when received data has been stored in a first of said at least first and second storing places and the second of said at least first and second storage places has not been accessed.

11. The data storing system for a communication control circuit according to claim 10, wherein, if a plurality of messages are received while said first storing place of said storing places is being accessed, said communication control means allows data of said messages to be stored in said second storing places, and when the access to said first storing place is terminated, said switch-controlling means switches between said first storing place and said second storing place.

12. The data storing system for a communication control circuit according to claim 1, wherein:
said storing means stores data received from the multiplex transmission line;
at least the first storage area of said storing means includes at least first and second storing places for storing said received data; and
said communication control circuit includes a switch-controlled means for switch-controlling the at least first and second storing places for storing said data;
said switch-controlling means executes switching of said at least first and second storing places when received data has been stored in said first storing place of said storing places and said second storing place has not been accessed, or disables switching of said storing places when said second storing place of said storing places has been accessed, or enables switching said first and second storing places when a last address of said second storing place has been accessed.

13. The data storing system for a communication control circuit according to claim 12, wherein, if a plurality of messages are received while said first storing place of said storing places is being accessed, said communication control means allows data of said messages to be stored in said second storing place, and when the access to said first storing place is terminated, said switch-controlling means switches between said first storing place and said second storing place.

14. A data storing system for a communication control circuit which is connected to a multiplex transmission line for storing data of messages to be transmitted to the multiplex transmission line and for then transmitting the messages, the communication control circuit comprising:
registering means for registering a particular data identifier among messages to be transmitted to the multiplex transmission line;
storing means including a first storage area for storing data corresponding to the particular data identifier, among the messages to be transmitted, in a manner related to the particular data identifier, and a second storage area for sequentially storing data corresponding to a plurality of data identifiers other than the particular data identifier; and
communication control means for, when transmitting a message to the multiplex transmission line, storing data of the corresponding data identifier in one of said first and storage second areas of said storing means.

15. The data storing system for a communication control circuit according to claim 14, wherein, when transmission of the data stored in the first or second storage area is completed, said communication control means renders the storage area. in which the data has been stored, in a state permitting a data storage change.

16. The data storing system for a communication control circuit according to claim 13, wherein said messages include data of predetermined priority levels, and if entered data, which should be stored in the second storage area, occurs when said second storage area is in a state which disables a data storage change, then the communication control means compares the priority level of the data stored in said second storage area with that of said entered data and, if the priority level of said entered data is found to be higher, said communication control means causing said entered data to be stored in said second storage area.

17. The data storing system for a communication control circuit according to claim 15, wherein said first and second storage area temporarily store data to be transmitted.

18. The data storing system for a communication control circuit according to claim 14, wherein said messages include data of predetermined priority levels, and if entered data, which should be stored in the second storage area, occurs when said second storage area is in a state which disables a data storage change, then the communication control means compares the priority level of the data stored in said second storage area with that of said entered data and, if the priority level of said entered data is found to be higher, said communication control means causing said entered data to be stored in said second storage area.

* * * * *